(12) United States Patent
Taylor (10) Patent No.: US 12,050,477 B2
(45) Date of Patent: Jul. 30, 2024

(54) LIQUID PRESSURE REDUCING VALVE

(71) Applicant: POLYMER TECHNOLGIES LIMITED, St. Helier (JE)

(72) Inventor: David Taylor, Portsmouth (GB)

(73) Assignee: POLYMER TECHNOLOGIES LIMITED (JE)

( * ) Notice: Subject to any disclaimer, the term of this patent is extended or adjusted under 35 U.S.C. 154(b) by 0 days.

(21) Appl. No.: 18/052,383

(22) Filed: Nov. 3, 2022

(65) Prior Publication Data

US 2023/0090964 A1 Mar. 23, 2023

Related U.S. Application Data

(63) Continuation of application No. 17/452,655, filed on Oct. 28, 2021, now Pat. No. 11,519,514, which is a
(Continued)

(30) Foreign Application Priority Data

Nov. 4, 2019 (GB) ..................... 1916022

(51) Int. Cl.
*G05D 7/06* (2006.01)
*E03B 7/07* (2006.01)
(Continued)

(52) U.S. Cl.
CPC ........... *G05D 7/0635* (2013.01); *E03B 7/072* (2013.01); *E03B 7/075* (2013.01);
(Continued)

(58) Field of Classification Search
CPC ............ G05D 16/202; G05D 16/2022; G05D 7/0635; G05D 16/2095; F16K 17/0453;
(Continued)

(56) References Cited

U.S. PATENT DOCUMENTS

| 4,265,270 A | 5/1981 | Satoh |
| 4,596,264 A | 6/1986 | Gladstone et al. |

(Continued)

FOREIGN PATENT DOCUMENTS

| EP | 1762922 A1 | 3/2007 |
| GB | 2165372 A | 4/1986 |

(Continued)

OTHER PUBLICATIONS

International Search Report and Written Opinion of the International Searching Authority for International application humber PCT/EP2021/062071 Feb. 21, 2022.
(Continued)

*Primary Examiner* — Atif H Chaudry
(74) *Attorney, Agent, or Firm* — Heslin Rothenberg Farley & Mesiti P.C.

(57) ABSTRACT

A fluid pressure reducing valve apparatus includes a pressure reducing valve. The valve has: a body containing a fluid-flow chamber, a liquid supply orifice into the chamber, a liquid outlet from the chamber, a regulation plate opposed to the orifice, a spring acting to urge the plate towards the orifice, and a diaphragm between the plate and the body to close the chamber between them. A controllable motor drive acts between the body and an end of the spring remote from the plate. A flow meter is positioned downstream of the outlet. A controller is arranged to receive flow data from the flow meter and to control the motor drive for withdrawal of the remote end of the spring in accordance with flow rate measured by the flow meter. For an increase in demand flow, the plate is partially withdrawn to maintain downstream pressure on such increase and vice versa.

17 Claims, 10 Drawing Sheets

Related U.S. Application Data continuation of application No. PCT/EP2021/062071, filed on May 6, 2021, and a continuation-in-part of application No. PCT/GB2020/052750, filed on Oct. 30, 2020.

(51) Int. Cl.

| | | |
|---|---|---|
| *F16K 17/04* | (2006.01) | |
| *F16K 17/06* | (2006.01) | |
| *F16K 31/04* | (2006.01) | |
| *F16K 31/50* | (2006.01) | |
| *F16K 37/00* | (2006.01) | |
| *G05D 16/20* | (2006.01) | |

(52) U.S. Cl.
CPC ........ *F16K 17/0453* (2013.01); *F16K 17/048* (2013.01); *F16K 17/06* (2013.01); *F16K 31/04* (2013.01); *F16K 31/50* (2013.01); *F16K 37/005* (2013.01); *G05D 7/0623* (2013.01); *G05D 16/202* (2013.01); *G05D 16/2022* (2019.01); *G05D 16/2086* (2013.01); *G05D 16/2095* (2019.01); *G05D 16/2097* (2019.01); *Y10T 137/7759* (2015.04)

(58) Field of Classification Search
CPC ........ F16K 31/04; F16K 31/50; F16K 37/005; F16K 17/06; E03B 7/072; E03B 7/075
See application file for complete search history.

(56) References Cited

U.S. PATENT DOCUMENTS

| | | | |
|---|---|---|---|
| 5,460,196 A | 10/1995 | Yonnet | |
| 5,662,137 A | 9/1997 | Schegerin | |
| 6,866,061 B2* | 3/2005 | Ye | G05D 16/2095 |
| | | | 137/487.5 |
| 11,519,514 B2* | 12/2022 | Taylor | F16K 37/005 |
| 2005/0016593 A1 | 1/2005 | Ephrat et al. | |
| 2011/0005250 A1* | 1/2011 | Perz | G05D 16/2013 |
| | | | 137/487.5 |
| 2015/0277446 A1* | 10/2015 | Peczalski | G01F 15/005 |
| | | | 137/486 |

FOREIGN PATENT DOCUMENTS

| | | |
|---|---|---|
| GB | 2176316 A | 12/1986 |
| GB | 2424966 B | 3/2007 |
| WO | 03057998 A2 | 7/2003 |
| WO | 2021089986 A1 | 5/2021 |

OTHER PUBLICATIONS

International Search Repot and Written Opinion of the International Searching Authority for International Application No. PCT/GB2020/052750 mailed on Feb. 28, 2021.

\* cited by examiner

LIQUID PRESSURE REDUCING VALVE

CROSS REFERENCES TO RELATED APPLICATIONS

This application is a continuation of, and claims priority to, U.S. patent application Ser. No.: 17/452,655, filed on Oct. 28, 2021, which is based on, and claims priority to, PCT Patent Application No.: PCT/EP2021/062071, filed on May 6, 2021, PCT Patent Application No.: PCT/GB2020/052750, filed on Oct. 30, 2020, and United Kingdom Patent Application No.: 1916022.5, filed on Nov. 4, 2019. The contents of the prior applications are hereby incorporated by reference herein in their entirety.

TECHNICAL FIELD

The present invention relates to a liquid pressure reducing valve, particularly though not exclusively for water mains.

BACKGROUND

Water supply networks typically comprise a high pressure regional mains network connected to a plurality of local networks. Water pressures in the high pressure mains supply are generally too high for consumers in the local networks and therefore pressure reducing valves are positioned at the interface between the high pressure main and the local network to reduce the pressures.

A typical pressure reducing valve (PRV) comprises a chamber having an inlet connected to the high pressure mains and an outlet connected to the local network. Typically, the valve has two chambers, an upper and a lower chamber separated by a diaphragm. Water passes through the PRV via the lower chamber. A reduced downstream pressure is achieved by allowing a hydraulic connection between the upstream pressure and the upper chamber of the PRV. In this hydraulic system the water from the upstream side passes through a pilot valve with a spring-loaded governor arrangement to allow water to escape from the upper chamber if the pressure in the upper chamber exceeds a predetermined level. More sophisticated conventional PRV's incorporate further hydraulic circuits to give more accurate control of the downstream pressure using various arrangements of differential control valves. A spring can be included in the upper chamber to provide a better seal when the upstream pressure is allowed unhindered into the upper chamber in order to completely close the valve.

Loss of water from mains is a problem due to the age of mains pipework and damage to mains and associated equipment. Many mains are old and have multiple leaks. Even newer mains can suffer leaks. Leak flow is greatest when the water pressure is highest, unsurprisingly.

A problem with such conventional PRV's setting the spring in a pressure reducing valve at the entrance to the local network with a substantially constant water pressure entering the network is that, for much of the time, when demand is lower, the local network will be over-pressurised. This will in turn exacerbate the problem of leakage.

Various proposals have been made for pressure reducing valves where the biasing force applied (e.g. by a spring) to the regulator plate or valve element can be varied automatically to accommodate changing levels of demand within the local network and thereby remove or alleviate the problem of over-pressurisation.

For example, GB 2,176,316 (NRDC) discloses an apparatus which is described in the abstract in the following terms:

Apparatus for controlling the flow of water through a pipe (26) including a valve (29) and an orifice plate (37) and supplying a water distribution system comprises a governor (1) actuating a pilot valve (14) in a servo system controlling the valve (29). The governor (1) has two diaphragms (5 and 6) linked by a tension spring (7) the extension of which is determined by the rate of flow through the orifice plate (37). The first diaphragm (5) operates a valve member (13) of the pilot valve (14) and is subjected to the differential pressure caused by flow through the orifice plate (37). The second diaphragm (6) is loaded by a compression spring (8) and its displacement is dependent upon the control pressure at a tapping (38) in the pipe (26); The movement of the valve member (14) is the combination of the displacements of the two diaphragms (5 and 6), and raises the control pressure at tapping (38) when demand for water increases.

GB 2165372 (TLV Co. Ltd) discloses a pressure reducing valve with a pressure-setting spring linked to an actuator which can change the force setting of the spring in response in the event that the difference between the pressure on the downstream side of the pressure reducing valve and a desired target pressure exceeds a certain value.

EP1762922 (R. Nussbaum AG) discloses a pressure reducing valve having a spring biased valve element which controls flow of liquid through a supply aperture leading to a chamber having a liquid outlet. The valve has an electro-mechanical actuator which can vary the force setting of the spring in response to changes in water pressure downstream of the pressure reducing valve.

WO 03/057998 (Optimus Water Technologies Ltd)) discloses an hydraulically controlled PRV, the operation of which is controlled by a complex hydraulic arrangement comprising a filter unit, flow restriction orifice, pilot valve and differential control valve (DCV) as well as the pressure reducing valve (PRV). A bypass pipe diverts a small proportion of the water entering the PRV through a control circuit linking the pilot valve and DRV. A branch pipe upstream of the pilot valve is connected to the pressure reducing valve but enters a pressure chamber containing the spring on the opposite side of the diaphragm from the regulator valve. Thus, in the PRV of WO 03/057998, there are "wet chambers" both sides of the diaphragm. The PRV of WO 03/057998 is not provided with an actuator for adjusting the spring pressure. Instead, the DCV is provided with an actuator which is responsive to pressure signals received from a controller and it is the DCV that refines the operation of the PRV. The water pressure control arrangement described in WO 03/057998 would appear to suffer from a number of potential disadvantages. Firstly the hydraulic control system is overly complex and there are more components that can go wrong. Secondly, the presumably narrow bore bypass tubes are likely to be more susceptible to blockage and/or freezing up, thereby interfering with or stopping the control function. Thirdly, in the PRV, both sides of the diaphragm are exposed to water meaning that the spring will presumably be permanently surrounded by water, with the consequent possibility of lime-scale accretion occurring to the spring itself which could affect the ability of the valve to completely close if or when required.

BRIEF DESCRIPTION

An object of the present invention is to provide an improved liquid pressure reducing valve which overcomes or at least alleviates the problems in known pressure reducing valves as described above.

The present inventor has noted a simple correlation between on the one hand pressure required downstream of a pressure reducing valve to maintain a given minimum pressure at a remote point of a local network, the pressure reducing valve being between a high pressure regional supply and the local network, and on the other hand flow in the local network. Both the required regulated pressure and the flow on the downstream side of the pressure reducing valve appear to be normally linearly related. Despite this, the present inventor is not aware of any pressure reducing valves controlled in accordance with flow through them, except for the somewhat complex arrangement disclosed in GB 2,176,316.

According to one aspect of the invention, there is provided a fluid pressure reducing valve apparatus comprising:
a spring loaded pressure reducing valve having:
    a body containing a fluid flow chamber,
    a fluid supply orifice into the chamber and a liquid outlet from the chamber,
    a regulation plate opposed to the orifice and subject in use to supply fluid acting on it,
    a spring acting to urge the plate towards to the orifice and
    a diaphragm between the regulation plate and the body to close the chamber between them and subject in use to regulated pressure in the chamber;
a controllable motor drive acting between the body and an end of the spring remote from the regulation plate,
a flow meter downstream of the outlet and
a controller arranged to receive flow data from the flow meter and to control the servo motor for withdrawal of the remote end of the spring in accordance with flow rate measured by the flow meter;
the arrangement being such that in use for increase in demand flow, the regulator plate is partially withdrawn to maintain downstream pressure on such increase and vice versa.

The body may have an interior void partitioned by the diaphragm into a fluid-flow chamber on one side of the diaphragm and a dry chamber on the other side of the diaphragm, wherein the fluid-flow chamber is provided with the fluid supply orifice into the chamber and a liquid outlet. By dry chamber is meant that the interior of the chamber does not come into contact with the fluid. This is in contrast to the pressure reducing valve disclosed in WO 03/057998 where both chambers either side of the diaphragm in the PRV are "wet" chambers; i.e. are exposed to the fluid (in that case water).

The fluid pressure reducing valve apparatus may further comprise an electronic data store held within or being in communication with the controller, the data store containing data defining a relationship between fluid flow rate and fluid pressure in a downstream pipe network to which the pressure reducing valve is connected.

Thus, the controller may be arranged to receive flow data from the flow meter and to control the motor drive for withdrawal or advancement of the remote end of the spring in accordance with the flow rate measured by the flow meter and the relationship between fluid flow and fluid pressure thereby to vary the position of the regulator plate and fluid flow through the fluid supply orifice to maintain a desired downstream fluid pressure.

In a second aspect, the invention provides a fluid pressure reducing valve apparatus comprising:
a spring loaded pressure reducing valve having:
    a body having an interior void partitioned by a diaphragm into a fluid-flow chamber on one side of the diaphragm and a dry chamber on the other side of the diaphragm,
    a fluid supply orifice into the fluid-flow chamber and a fluid outlet from the fluid-flow chamber,
    a regulation plate opposed to the orifice and subject in use to supply fluid acting on it, the regulation plate being connected directly or via a connecting element to the said one side of the diaphragm, and the diaphragm in use being subject in use to regulated pressure in the fluid-flow chamber
    a compression spring located in the dry chamber on the said other side of the diaphragm, the compression spring being arranged so as to apply pressure through the diaphragm to urge the plate towards the orifice and
a controllable motor drive acting between the body and an end of the compression spring remote from the regulation plate,
a flow meter downstream of the outlet;
a controller and an electronic data store held within or being in communication with the controller, the data store containing data defining a relationship between fluid flow rate and fluid pressure in a downstream pipe network to which the pressure reducing valve is connected;
the controller being arranged to receive flow data from the flow meter and to control the motor drive for withdrawal or advancement of the remote end of the spring in accordance with the flow rate measured by the flow meter and the relationship between fluid flow and fluid pressure thereby to vary the position of the regulator plate and fluid flow through the fluid supply orifice to maintain a desired downstream fluid pressure.

Preferably the controllable motor drive is a servo motor drive.

The fluid may be a liquid or gas.

In one general embodiment, the fluid is a liquid.

In another general embodiment, the fluid is a gas such as a gaseous hydrocarbon.

When the fluid is a liquid, it may for example be water or a liquid hydrocarbon.

In one particular embodiment, the fluid is water.

In another particular embodiment, the fluid is a liquid hydrocarbon.

The invention is particularly applicable to water mains. It is envisaged that the invention will also be applicable to hydrocarbon fluids both liquid and gaseous in form.

The controller can be adapted for calculation of the server motor action in spring positioning in accordance with a substantially linear downstream pressure and flow rate relationship. The calculation can be based on pressure to be achieved in terms of servo positioning of the spring; or on servo positioning of the spring alone. Alternatively it can be adapted for servo motor action in accordance with a lookup table of downstream pressure and flow rate. Again, the lookup table can include values of pressure to be achieved, but is preferably includes spring positions in terms of servo revolutions.

When the fluid is water and the pressure reducing valve is connected to a local water network, the controller can be programmed, or instructed by a remote control centre, to vary the flow rate so as to ensure that the minimum water pressure provided to a remote user in the network (i.e. the user at which there is the greatest pressure drop) is within the range from 0.5 Bar to 2 Bar. More usually, the controller is programmed, or instructed by a remote control centre, to vary the flow rate so as to ensure that the minimum water pressure provided to a remote user in the network is within the range from 0.6 Bar to 1.5 Bar, more typically 0.7 Bar to 1.2 Bar. In one embodiment, the minimum water pressure provided to a remote user in the network is approximately 1 Bar.

The pressure reducing valve apparatus of the invention may be connected to a remote control facility (which may be referred to herein for convenience as a remote control room, even though it may not be a room as such). Either or both of the flow meter and controller may be connected to the remote control facility (remote control room), for example by wireless communication.

In one embodiment, only the controller is connected to the remote control facility.

In another, and preferred, embodiment, both the flow meter and controller are connected to the remote control facility.

By connecting the pressure reducing valve apparatus of the invention to a remote control room, it is possible for local control of the apparatus to be overridden remotely (e.g. manually), for various operational reasons, such as the detection of abnormally high flows of fluid (e.g. a liquid such as water) in the network that are indicative of a major leak, for example a burst pipe.

The controller may be programmed to send alarm signals to the remote control room if fluid flows exceed a certain threshold level.

Accordingly, in a further embodiment, the invention provides a fluid pressure reducing valve apparatus comprising a spring loaded pressure reducing valve, a controllable motor drive, a flow meter and controller as defined herein, wherein the wherein the fluid pressure reducing valve apparatus is linked (e.g. wirelessly) to a remote control facility, from which remote control facility, the operation of the apparatus can be remotely controlled.

A local network will typically form part of a larger network in which a plurality of lower pressure local network are each connected to a high pressure main by a pressure reducing valve apparatus of the invention.

Accordingly, in a still further embodiment, the invention provides a water supply system, the water supply system comprising a plurality of local networks, each of the local networks being provided with a pressure reducing valve apparatus of the invention as defined herein.

The water supply system typically comprises a remote control facility (e.g. a Main Control Room) as hereinbefore defined to which the controllers of each of the pressure reducing valve apparatuses of the local networks are linked.

Additionally, or alternatively, the flow meters of each of the pressure reducing valve apparatuses of the local networks may be connected to the remote control facility.

In another embodiment, the invention provides a method of controlling the water pressure in a local water network having a pressure reducing valve connecting the local water network to a high pressure mains supply, the method comprising:
(i) providing the pressure reducing valve with a motorised actuator that can vary the flow of water into the network upon receipt of control signals from a controller;
(ii) providing the network with a flow meter and pressure sensor downstream (e.g. immediately downstream) of the pressure reducing valve, the flow meter and sensor being in communication with the controller;
(iii) measuring flow rates and pressures to establish a relationship between flow rate and pressure of water flowing into the network, and storing data establishing the relationship in the controller and/or a remote control location;
(iv) using the said relationship to establish a pressure reducing valve setting at a given time point which maintains a desired minimum pressure at a defined remote location in the network; and
(v) monitoring changes in the flow rate in the network detected by the flow meter and actuating the motorised actuator to change the pressure reducing valve setting in response to the changes in the flow rate in order to maintain the desired minimum pressure at the defined remote location in the network.

The pressure reducing valve used in the above method is preferably a pressure reducing valve in accordance with the invention as defined and described herein.

DRAWINGS

In FIG. 6, $F^D$ is the flow at peak demand, $P^R$ is the pressure required at the remote user at the peak demand flow rate $F^D$, $P^D$ is the set pressure at $F^D$ to give the pressure $P^R$, $F^N$ and $F^{N+1}$ are instantaneous flow rates, $P^M$ and $P^{M+1}$ are instantaneous pressures at the remote user, and $P^N$ and $P^{N+1}$ are instantaneous downstream pressures.

FIGS. 7A-7D show graphs of pressure and flow rates over a twenty four hour period in a water supply network incorporating a pressure reducing valve apparatus of the invention. The pressure and flow rates shown in the graphs are those needed to maintain a water pressure of 1 bar at a remote location in the network.

DETAILED DESCRIPTION

To help understanding of the invention, specific embodiments thereof will now be described by way of example and with reference to the accompanying drawings FIGS. 1 to 8.

Figure 1:
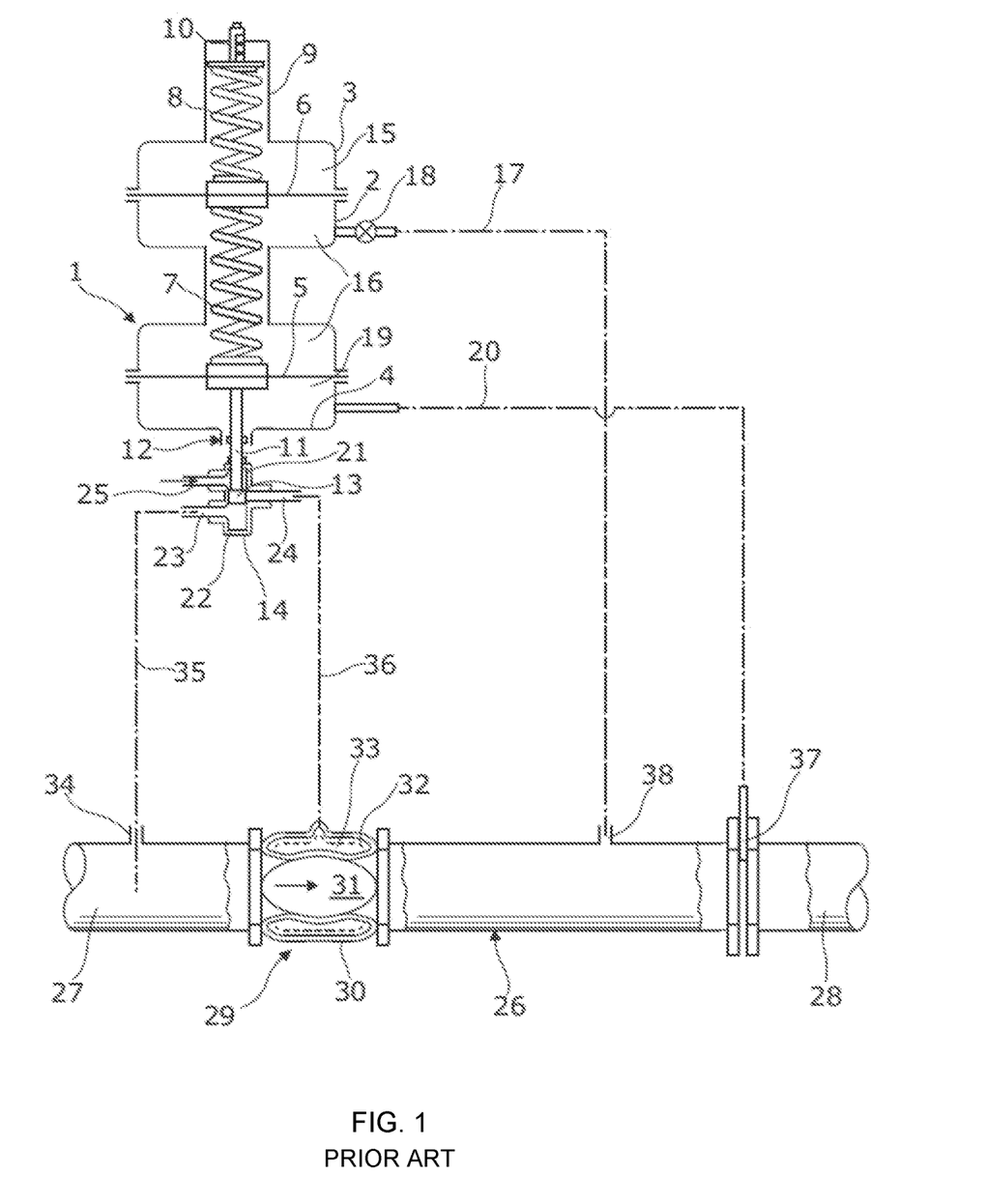
FIG. 1 is FIG. 2 of prior proposal GB 2,176,316.
Figure 2:
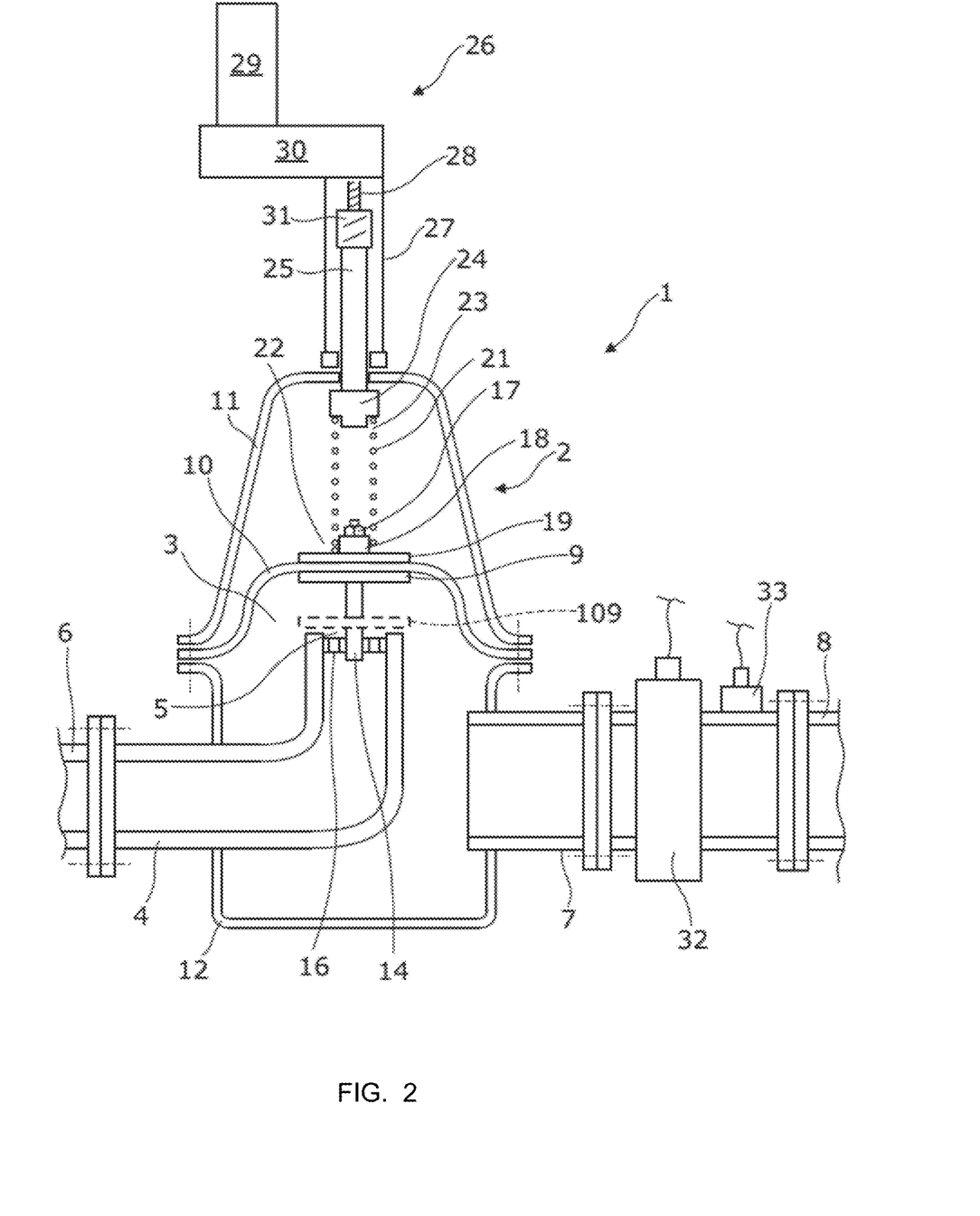
FIG. 2 is a diagrammatic, cross-sectional, side view of a pressure reducing valve apparatus according to one embodiment of the invention.
Figure 3:
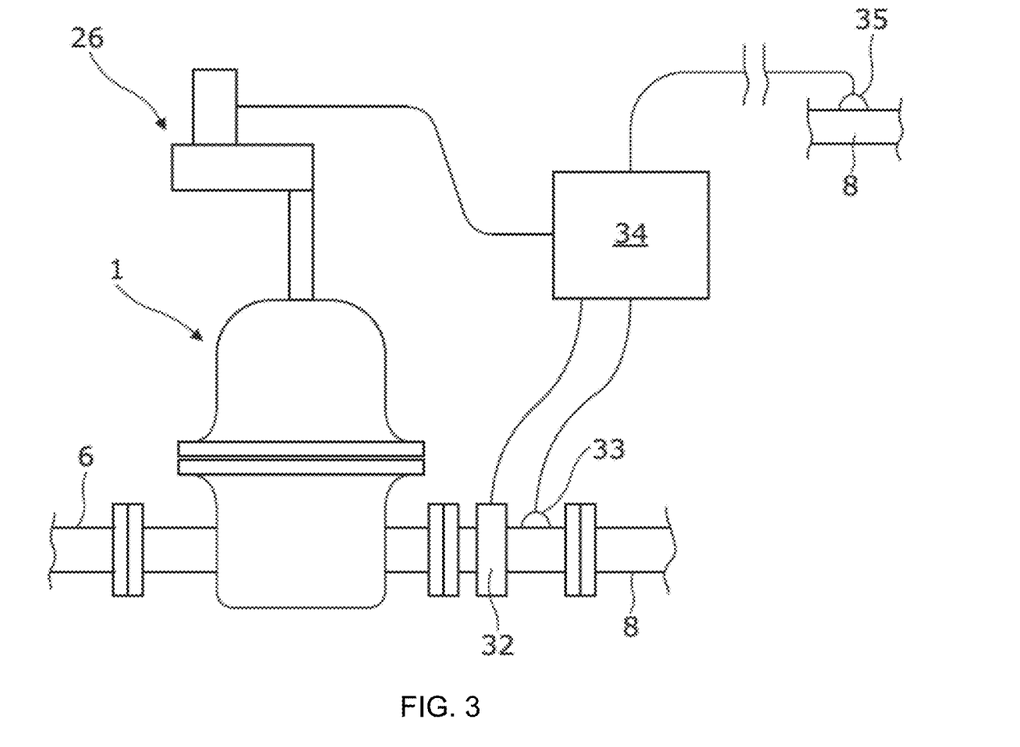
FIG. 3 is a schematic view showing the apparatus of FIG. 2 (but with a very slightly differently shaped upper casing) connected to a controller which is also connected to a remote pressure sensor.

Referring to the drawings, a spring loaded pressure reducing valve 1 has a body 2 containing a water flow chamber 3. An inlet 4 opens into the water flow chamber via an inlet orifice 5. The inlet is connected to an elevated pressure water main 6. An outlet 7 from the water flow chamber is connected to a network 8 of pipes for local distribution of water to individual consumers. The valve has a flow pressure regulation plate 9 arranged opposite the inlet orifice 5. A diaphragm 10 is fastened to the plate 9 and radiates from it to the body, forming a seal with upper and lower parts 11,12 of the body 2. Thus, the water flow chamber 3 is sealed between the upper and lower parts. The space above the diaphragm is a dry chamber; i.e. water does not flow into this space.

The regulation plate has a guide rod 14 extending down from it into a guide 16 in the inlet orifice 5. The rod extends through both the regulation plate and the diaphragm. At its top end, inside the dry chamber, it carries a nut 17 bearing on a spring centring washer 18 and a diaphragm sealing and clamping plate 19. The arrangement keeps the regulation plate centred over the inlet orifice 5.

In a variant, a separate regulation plate 109 opposite the orifice is provided on the lower rod 14. The diaphragm keeps the plate 9/109 centred over the orifice 5.

A compression spring 21 located in the dry chamber acts at its lower end 22 on the top of the clamping plate 19. The spring is kept compressed to a greater or lesser extent as explained below. Thus, it stays located around the centring washer 18. Its upper end 23 abuts a spring drive member 24 at the end of a drive tube 25 of a servo device 26. The drive tube is housed in a fixed tube 27 of the servo device, fast with the upper part 11 of the valve body 2. Remote from the spring a lead screw 28 is journalled for axial alignment in the drive tube within the fixed tube. A motor 29 and gearbox 30 are arranged to the drive the lead screw. A nut 31, preferably a recirculating ball nut, is fast with the remote end of the drive tube 25, with the latter keyed to the fixed tube against rotation. Thus, the spring drive member can be advanced to further compress the spring or retracted to relieve compression, by respective rotation of the motor and the lead screw.

Figure 5:
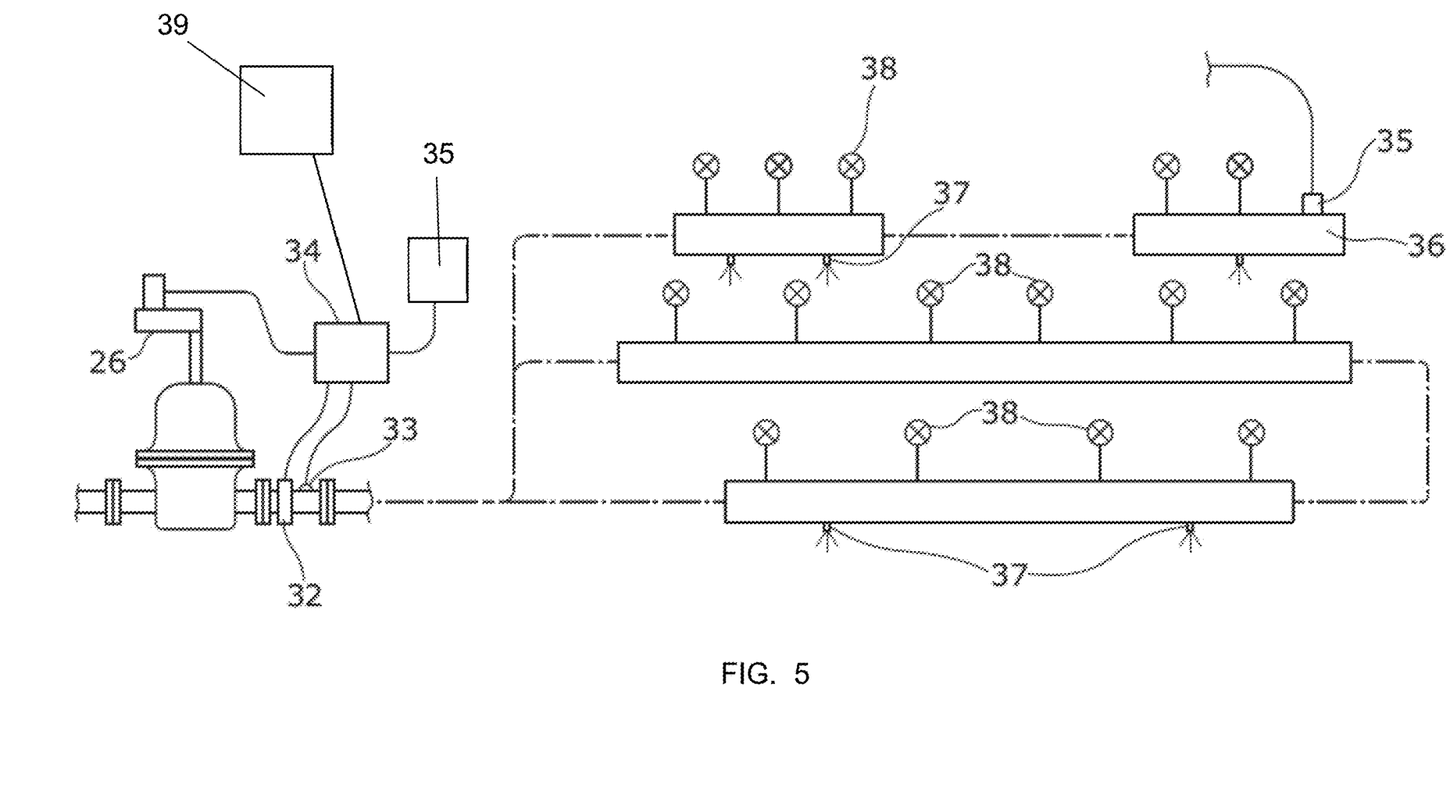
FIG. 5 is a schematic view of a water supply network showing a water main having a pressure reducing valve apparatus of the invention and a local network comprising a plurality of customer supply taps (and leaks) downstream of the reducing valve apparatus. The reducing valve apparatus is linked to a linked to a main control room.

Downstream from the outlet 7, the pipework 8 of the local distribution network extends. In it adjacent the outlet is a flow meter 32 and a pressure sensor 33. These are electronically connected to a controller 34. Also connected to the controller is a remote pressure sensor 35 at the furthest point 36 of the pipework 8. The controller 34 is also connected to a remote main control room 39. The main control room typically controls a plurality of local distribution networks, each equipped with its own controller and pressure reducing valve apparatus. As an alternative to each local distribution network having its own controller, the operation of the pressure reducing valves can be controlled directly from the main control room.

Along the pipework, there are various leaks 37, which increase in their flow rate with pressure and a number of user taps 38 etc. It is these which are the primary determinant of the flow at the pressure regulator 1. If it were of the type permanently set to a pressure maintaining sufficient pressure at the furthest point 36 in the network, the pressure would be such as to aggravate the leaks 37 regardless of the user flow at the taps 38.

In this embodiment of the invention, the entire pressure reducing valve apparatus includes not only the pressure reducing valve 1 and the flow meter 32, but also the controller 38 for controlling the regulator, via the servo motor, in accordance with flow measured by the flow regulator and indeed the remote pressure sensor 35, which is not strictly necessary for the invention.

Figure 4:
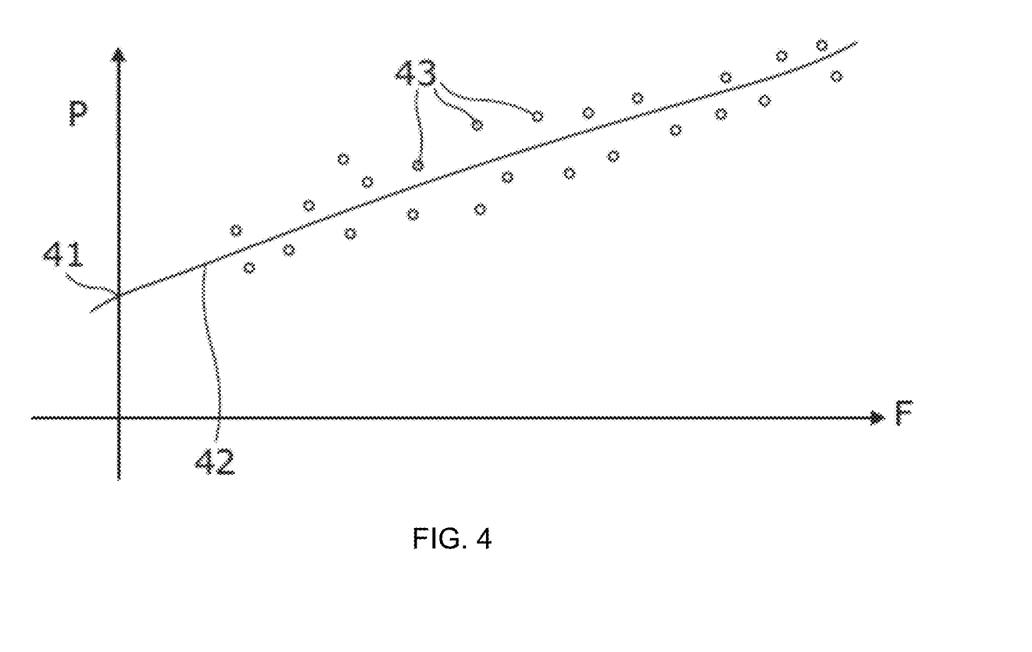
FIG. 4 is a typical plot of pressure required to be applied in a network for constant remote pressure with varying demand flow.

Many local distribution networks such as the network 8 have been previously measured and exhibit a pressure/flow characteristic as shown in FIG. 4 when the regulator is set to provide the required furthest point pressure for varying flows. The ideal low pressure point 41 for zero flow seldom exists due to leaks. The practical low pressure point 42 can be measured at night when user demand is negligible. Other flow and pressure readings 43 can be made during periods of more and less usage by adjusting the pressure reducing valve to provide the sufficient furthest point pressure.

In practice, the pressure flow plot is a substantially straight line with a slope or gradient and an offset equivalent to the zero flow offset. The plot can be represented by the equation:

$$\text{Pressure required at regulator} = \text{Zero flow pressure} + \text{measured flow} \times \text{plot gradient (in terms of pressure per unit flow)}.$$

This is surprising, because it might be expected that adjustment of the regulator would alter the measured flow. However, this is a second order effect because the primary determinant of flow is user usage. The leak flow is small by comparison and kept lower than it might be, by keeping the pressure in the network lower than it would be, if were set to its value to ensure that its furthest point sufficiency at maximum flow. This value results in too much flow and too much leakage at all other flows.

The spring 21 in the pressure reducing valve acts against the force exerted by the diaphragm 10, which is subject to the pressure to be regulated, the upstream pressure force exerted against the regulation plate 9 being substantially constant and being small in comparison with the diaphragm force. Thus, shortening of the spring by an amount proportional to the change in pressure required can provide this change, bearing in mind that only a small movement of the regulation plate is required for a significant change in pressure drop at the orifice of the outlet. Thus, for practical purposes, linear movement of the end of the spring acted on by the servo motor causes a linear change in regulated pressure. Accordingly, the controller can be set up to move the spring end linearly in accordance with the flow.

If the zero flow pressure and the gradient of the measured flow plot are not known, the controller can be set up to adjust the regulated pressure periodically for different flows to establish the pressures required to achieve the sufficient furthest away point pressure. For this connection is made with the remote pressure sensor 35 and the near pressure sensor 33, suitably wirelessly in the former case.

The controller can be provided with a memory adapted to record a map of pressure and flow as opposed to memorising merely the offset and gradient and use this as a look-up table for the pressure to which it should regulate the downstream pressure as a function of measured flow.

The sensor 33 can be used to fine tune the servo motor control to achieve the desired pressure in accordance with measured flow.

The manner in which the apparatus of the invention is set up to control water pressure in a network will now be described in more detail with reference to FIGS. 5 to 8.

The pressure/flow characteristics of a local water supply network will vary according to a number of variables such as the length of pipework, the number of consumers, the number of leaks in the network and the location of the most remote user. Therefore, when setting up the apparatus of the invention, an initial step is to establish a pressure/flow relationship for the network and, in particular, to establish the flow rates into the network that are necessary in order to maintain a desired water pressure at the most remote user at various times during a twenty four hour period. To do this, for a twenty four hour period, the flow rates and water pressures are measured by flow meter 32 and pressure sensor 33 and the water pressure at the remote user is measured by remote pressure sensor 35 and adjusted where necessary using the pressure reducing valve to maintain a desired minimum pressure at the remote user. The pressure and flow data are communicated from the flow meter and pressure sensors to the controller and a relationship between the flow rate and pressure established as described above.

A set of pressure and flow rate data for one local distribution comprising the pressure reducing valve apparatus of the invention is shown in Table 1 below.

In the table, the water pressure data for the upstream side (i.e. high pressure main) of the pressure reducing valve are shown in the columns headed I/L Pressure whereas the water pressures downstream of the pressure reducing valve are shown in the columns headed O/L Pressure. Pressure figures are given in both Bars and Head of Water in metres. The flow rates (given in both cubic metres per hour and litres per second) are the flow rates measured by the flow meter 32. The data are the pressures required to maintain a water pressure of 1 Bar at the remote user. The pressure and flow rate profiles over a twenty four hour period are shown in FIGS. 7A to 7D. The relationship between pressure and flow rate obtained from the data is shown in the graph in FIG. 4.

TABLE 1

| Time | Flow m³ per hour | I/L Pressure m head | I/L Pressure Bar | O/L Pressure m head | Flow Litres per second | O/L Pressure Bar |
|---|---|---|---|---|---|---|
| 0 | 5.50 | 54.92 | 5.38 | 26.575 | 1.5279 | 2.60435 |
| 1 | 4.80 | 53.76 | 5.27 | 25.42 | 1.3334 | 2.49116 |
| 2 | 4.60 | 53.43 | 5.24 | 25.09 | 1.2779 | 2.45882 |
| 3 | 4.70 | 53.60 | 5.25 | 25.255 | 1.3057 | 2.47499 |
| 4 | 5.30 | 54.59 | 5.35 | 26.245 | 1.4723 | 2.57201 |
| 5 | 6.30 | 56.24 | 5.51 | 27.895 | 1.7501 | 2.73371 |
| 6 | 7.70 | 58.55 | 5.74 | 30.205 | 2.1391 | 2.96009 |
| 7 | 8.90 | 60.53 | 5.93 | 32.185 | 2.4724 | 3.15413 |
| 8 | 8.50 | 59.87 | 5.87 | 31.525 | 2.3613 | 3.08945 |
| 9 | 7.30 | 57.89 | 5.67 | 29.545 | 2.0279 | 2.89541 |
| 10 | 7.30 | 57.89 | 5.67 | 29.545 | 2.0279 | 2.89541 |
| 11 | 7.80 | 58.71 | 5.75 | 30.37 | 2.1668 | 2.97626 |
| 12 | 8.20 | 59.37 | 5.82 | 31.03 | 2.278 | 3.04094 |
| 13 | 9.30 | 61.19 | 6.00 | 32.845 | 2.5835 | 3.21881 |
| 14 | 8.80 | 60.36 | 5.92 | 32.02 | 2.4446 | 3.13796 |
| 15 | 9.00 | 60.69 | 5.95 | 32.35 | 2.5002 | 3.1703 |
| 16 | 9.40 | 61.35 | 6.01 | 33.01 | 2.6113 | 3.23498 |
| 17 | 10.30 | 62.84 | 6.16 | 34.495 | 2.8613 | 3.38051 |
| 18 | 12.00 | 65.64 | 6.43 | 37.3 | 3.3336 | 3.6554 |
| 19 | 12.30 | 66.14 | 6.48 | 37.795 | 3.4169 | 3.70391 |
| 20 | 11.40 | 64.65 | 6.34 | 36.31 | 3.1669 | 3.55838 |
| 21 | 9.70 | 61.85 | 6.06 | 33.505 | 2.6947 | 3.28349 |
| 22 | 10.20 | 62.67 | 6.14 | 34.33 | 2.8336 | 3.36434 |
| 23 | 8.40 | 59.70 | 5.85 | 31.36 | 2.3335 | 3.07328 |
| 24 | 5.30 | 54.59 | 5.35 | 26.245 | 1.4723 | 2.57201 |

Applying the relationship Y=mX+c to the data and the graph gives a gradient (m) of 1.65 and a theoretical low pressure point (c) at zero flow rate of 17.5 (Head of Water in metres). However, because in practice there is never a zero flow rate (e.g. because of leaks), a practical low pressure point is a pressure of about 25 metres (Head of Water).

Figure 6:
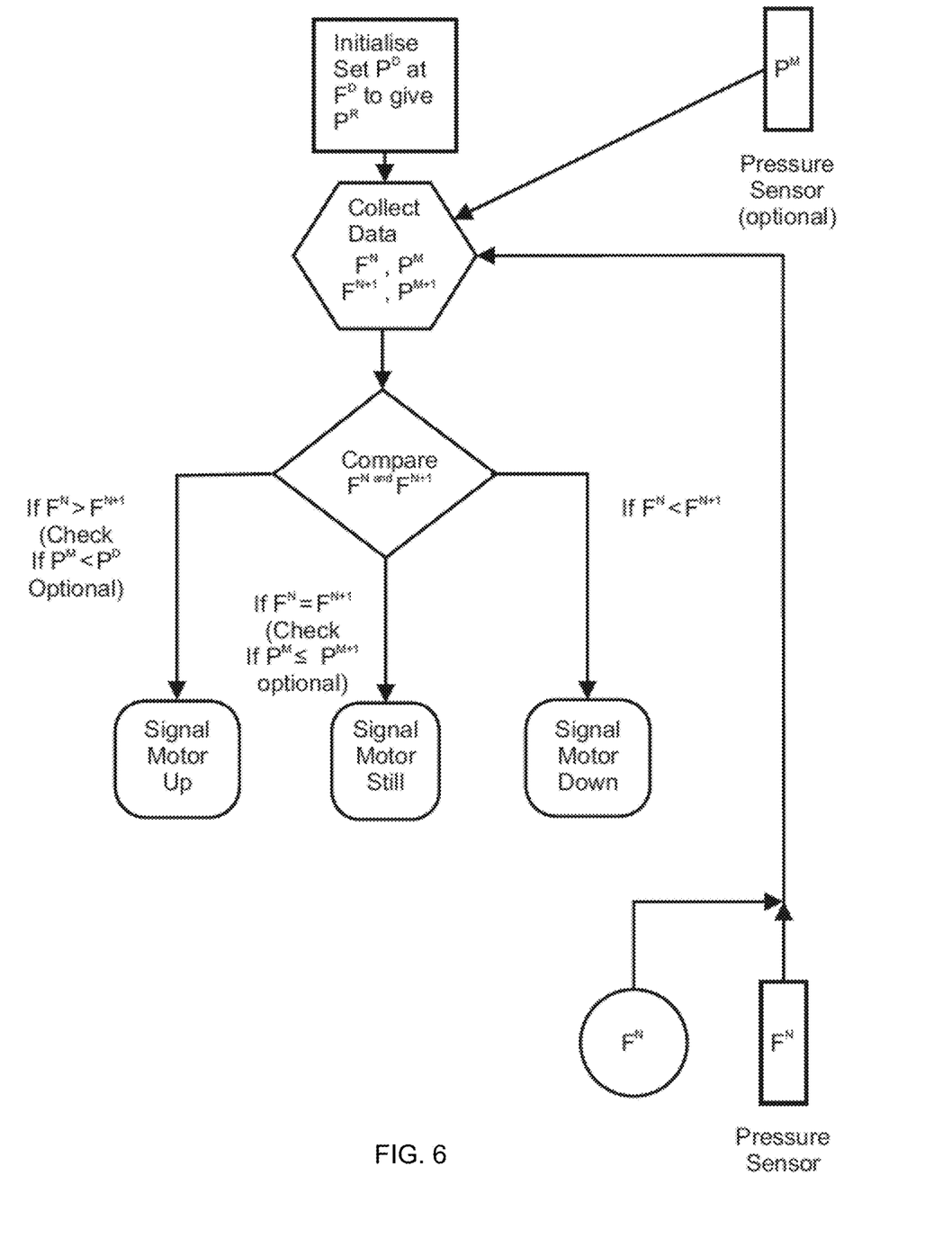
FIG. 6 shows an algorithm used to control the operation of a pressure reducing valve apparatus of the invention.
Figure 7A:
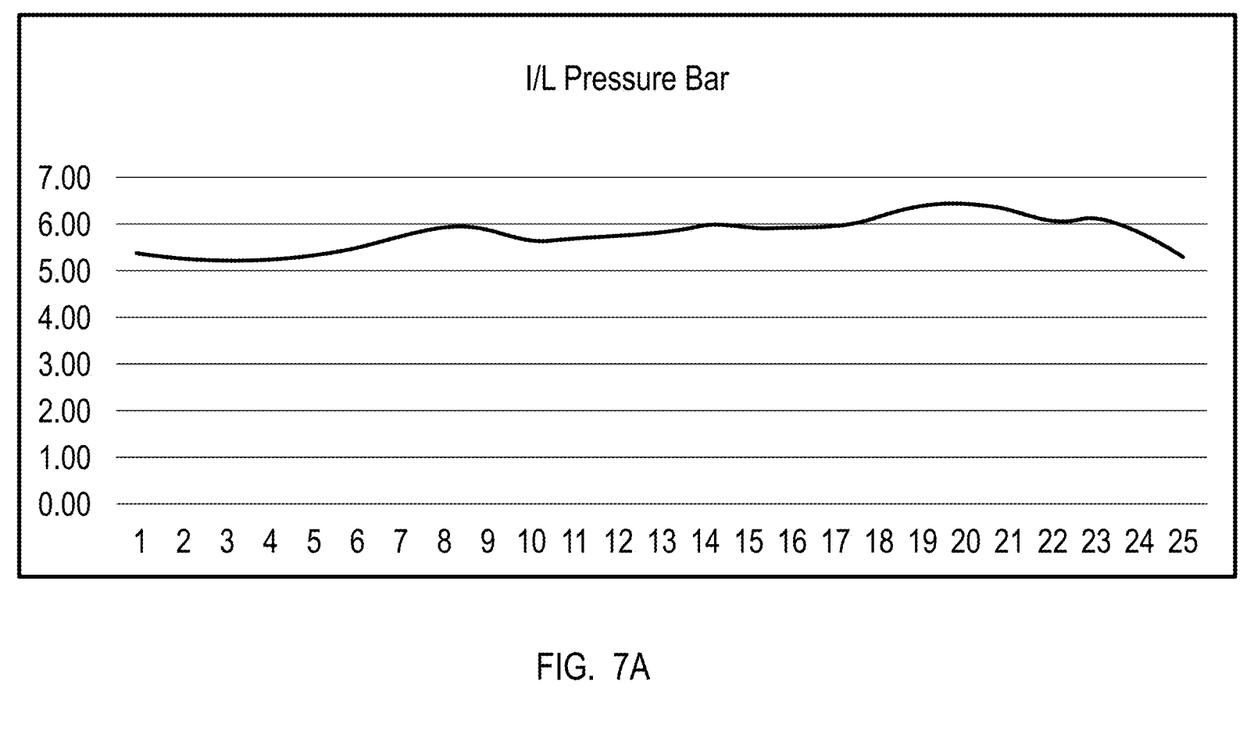
FIG. 7A shows the mains pressure (in Bars) on the upstream side of the pressure reducing valve.
Figure 7B:
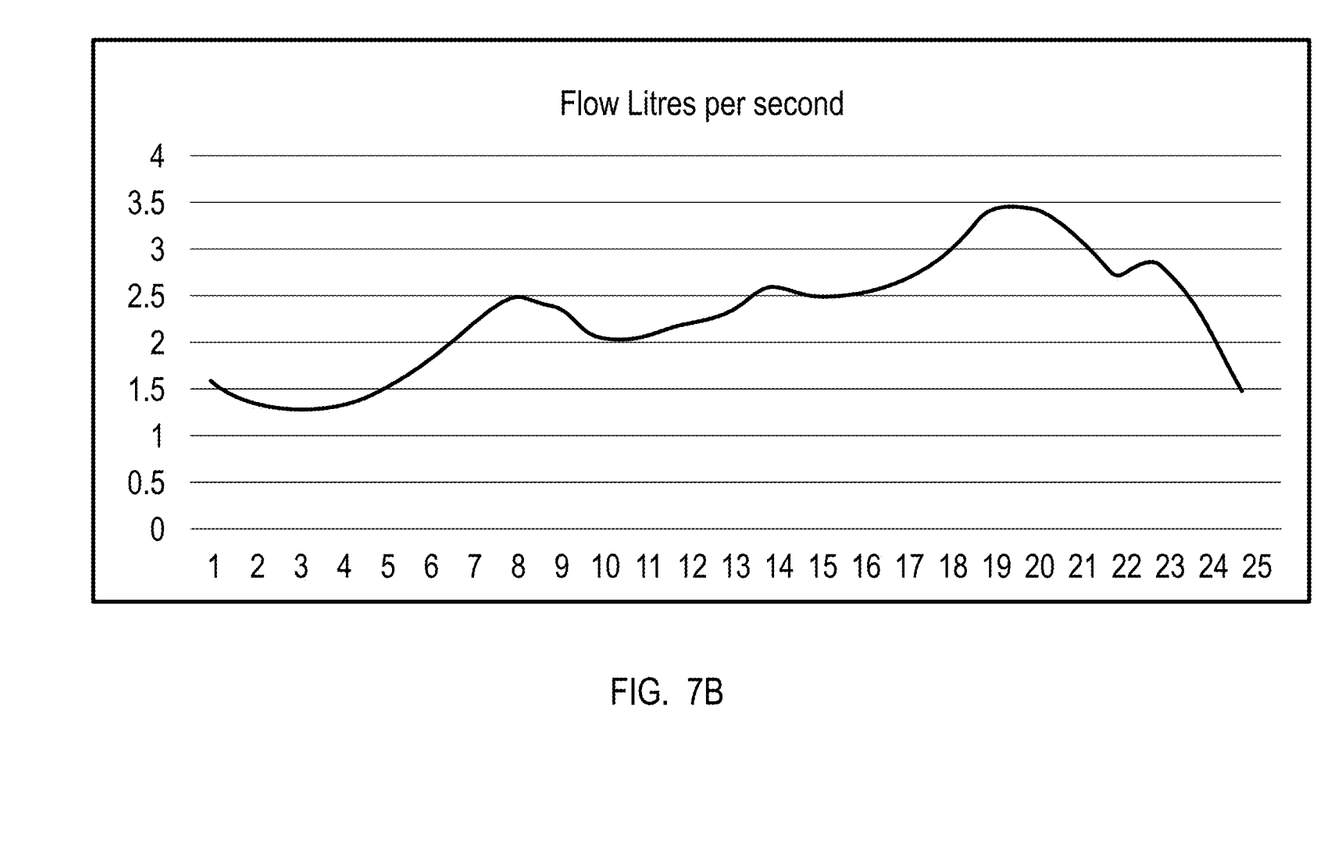
FIG. 7B shows the flow rate in litres per second as measured by a flow meter immediately downstream of the pressure reducing valve.
Figure 7C:
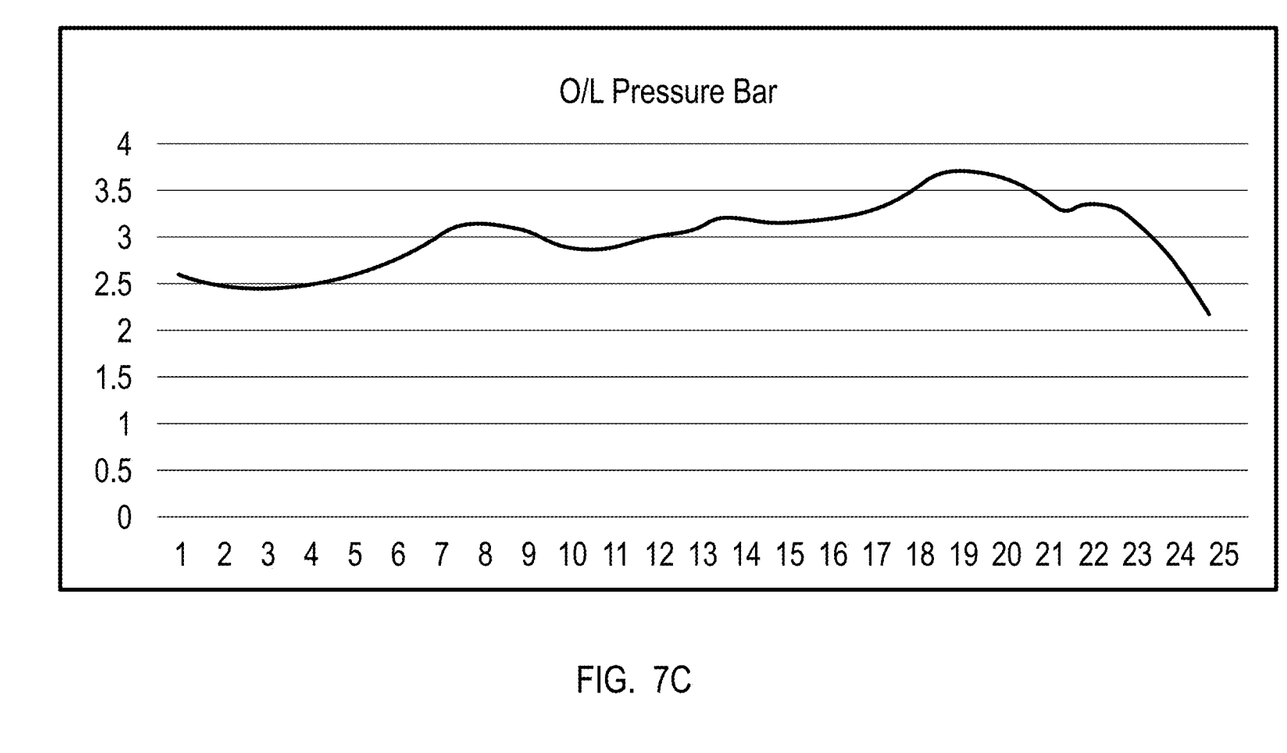
FIG. 7C shows the water pressure measured by a pressure sensor immediately downstream of the pressure reducing valve and the flow meter.
Figure 7D:
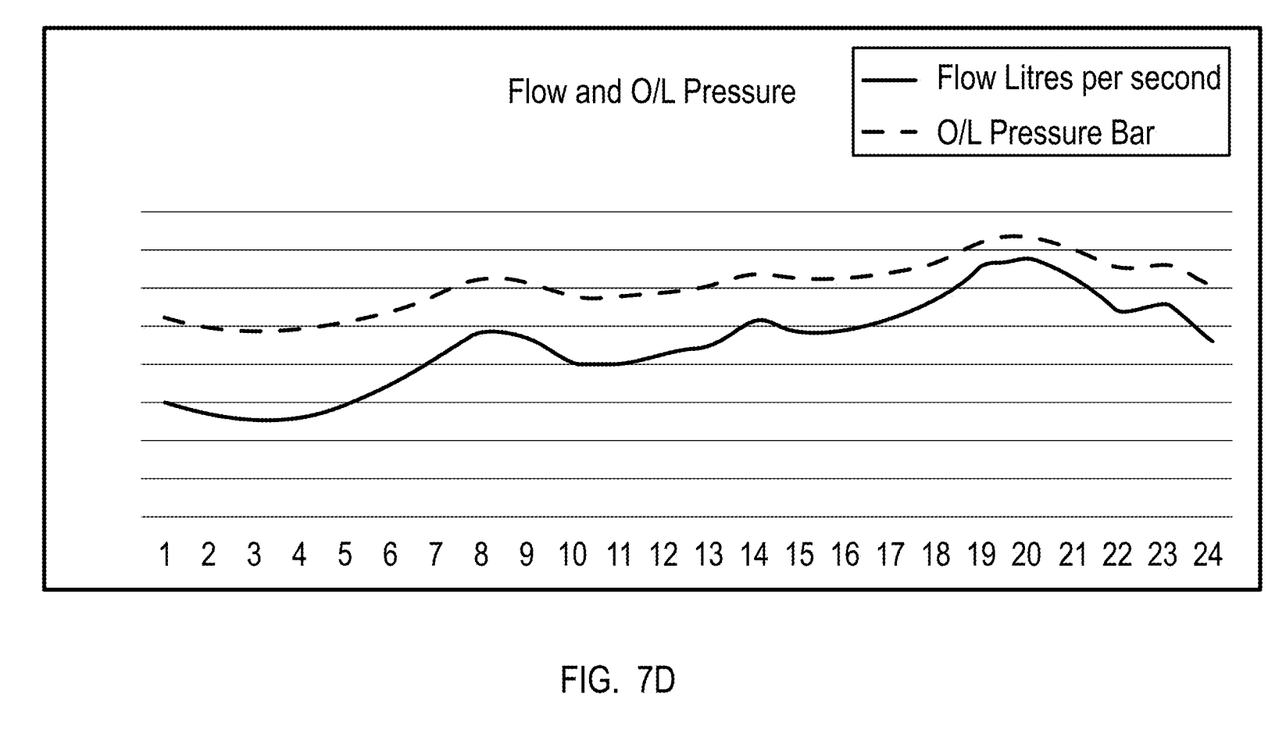
FIG. 7D shows the superimposed flow rate and pressure plots of FIGS. 7B and 7C.

Once the pressure/flow relationship has been established empirically as described above (although it is also possible to derive a relationship by theoretical calculations), this relationship serves as the basis for control of the pressure reducing valve according to the algorithm shown in FIG. 6.

Thus, as shown in the algorithm in FIG. 6, the pressure reducing valve is initially adjusted by using the servo motor to position the spring 21 so that if the flow rate measured by the flow meter 32 were the flow rate $F^D$ at peak demand, the water pressure $P^D$ measured by sensor 33 would be such as to give the desired minimum pressure $P^R$ at the remote location. Data are then gathered for the actual flow rates into the downstream pipework 8. A first flow rate measurement $F^N$ at time point 1 is taken and compared with the peak flow rate figure $F^D$. If $F^N$ is less than $F^D$, then the water pressure is reduced by actuating the servo motor to move the position of the spring drive member 24 and spring 21 to increase the biassing force of the spring against the regulation plate 9. At a second time point, the flow rate is measured again to give a flow rate $F^{N+1}$. If the flow rate has fallen against, a further movement of the spring drive member 24 and spring 21 to increase the biassing force of the spring against the regulation plate 9 is effected so as to reduce further the water pressure as measured by sensor 33. On the other hand, if the flow rate $F^{N+1}$ has increased, the spring drive member 24 and spring 21 are moved in the reverse direction to reduce the biassing force of the spring against the regulation plate thereby to the increase the water pressure in the pipework 8. Thus, by taking flow rate measurements at regular intervals and comparing each new flow rate measurement $F^{N+1}$ with its preceding flow rate measurement, the water pressure in the pipework 8 can be constantly adjusted so that the pressure as measured by the sensor 33 is kept to the minimum necessary to provide the desired minimum pressure $P^R$ at the remote location 36.

Figure 8:
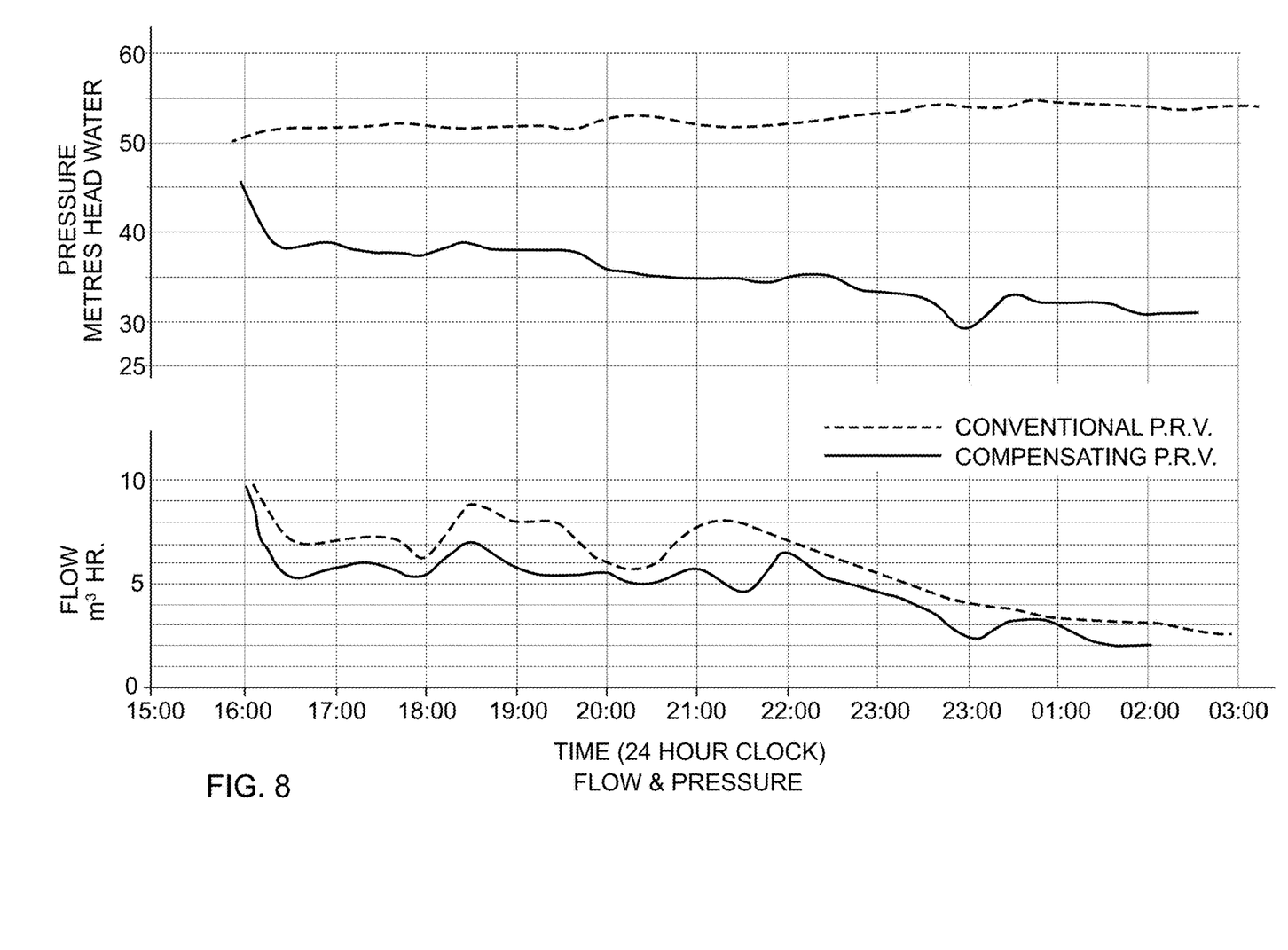
FIG. 8 shows a comparison of the water pressures and water flow rates downstream of a pressure reducing valve over an eleven hour time period where the pressure reducing valve is of convention type (dotted lines) or a pressure reducing valve apparatus of the invention (solid lines). The pressures shown in the uppermost graph are pressures (expressed as the head of water in metres) required to maintain a water pressure of 1 Bar at the remote location in the network.

In conventional local water supply networks, pressure reducing valves are typically set up so that the water pressure measured immediately downstream of the pressure reducing valve is the minimum water pressure required to give a defined pressure at remote location 36. As a result, the network is over-pressured for much of the time with the result that, inter alia, water losses through leakage are greatly increased. This problem is avoided using the pressure reducing valve apparatus of the present invention. The advantages of the pressure reducing valves of the present invention compared to conventional pressure reducing valves set up to provide a constant water pressure are illustrated by the graphs shown in FIG. 8. The lower graph shows the flow rates at various times of the day. The flow rates measured in a network fitted with a conventional pressure reducing valve are shown as dotted lines whereas the flow rates measured when the conventional pressure reducing valve was replaced by a pressure reducing valve apparatus of the invention are shown in solid lines. The uppermost graph in FIG. 8 shows the water pressures within the network over the same period. As can be seen, the water pressure in the network fitted with a conventional PRV remains constant and therefore the pressure is much higher than it needs to be. By contrast, the pressure in the same network fitted with a pressure reducing apparatus of the invention is significantly lower throughout the time period tested but is still sufficient to maintain the desired water pressure at the remote location.

In the network shown in FIG. 5, the controller 34 is linked to a Main Control Room 39 (remote control room), a location from which the network can be controlled remotely. The main control room can be linked to a plurality of local networks fed by a high pressure main, each of the local networks being provided with a pressure reducing valve apparatus of the invention. Alternatively, or additionally, the flow meters and pressure sensors in each local network can be linked to the Main Control Room and alarm signals generated in the Main Control Room if abnormal flow rates (e.g. indicative of a major mains failure or major leaks such as burst pipe) are detected. By linking the controller 34 to a remote control room, remote control of the downstream pressures and flow rates can be achieved, where required for operational purposes.

The invention claimed is:

1. A fluid pressure reducing valve apparatus comprising:
    a spring loaded pressure reducing valve having:
        a body containing a fluid-flow chamber,
        a liquid supply orifice into the chamber and a liquid outlet from the chamber,
        a regulation plate selectively closing the orifice and subject in use to supply liquid acting on it,
        a spring acting to urge the plate towards to the orifice and
        a diaphragm between the regulation plate and the body to close the chamber between them and subject in use to regulated pressure in the chamber,
    a controllable motor drive acting between the body and an end of the spring remote from the regulation plate,
    a flow meter downstream of the outlet, and
        a controller arranged to receive flow data from the flow meter and to control the motor drive for withdrawal of the remote end of the spring in accordance with flow rate measured by the flow meter;
    the arrangement being such that in use for increase in demand flow, the regulator plate is partially withdrawn to maintain downstream pressure on such increase and vice versa;
    wherein the body has an interior void partitioned by the diaphragm into the fluid-flow chamber on one side of the diaphragm and a dry chamber on the other side of the diaphragm.

2. A fluid pressure reducing valve apparatus as claimed in claim 1, wherein the apparatus is adapted for reducing the pressure of water.

3. A fluid pressure reducing valve apparatus as claimed in claim 1, wherein the controllable motor drive is a servo motor drive.

4. A fluid pressure reducing valve apparatus as claimed in claim 3, wherein the controller is adapted for calculation of the servo motor action in spring positioning in accordance with a substantially linear downstream pressure and flow rate relationship, wherein the calculation is based on servo positioning of the spring alone.

5. A fluid pressure reducing valve apparatus as claimed in claim 4, wherein the calculation is based on a lookup table of downstream pressures and flow rates.

6. A fluid pressure reducing valve apparatus as claimed in claim 5, wherein the lookup table includes values of pressure to be achieved.

7. A fluid pressure reducing valve apparatus as claimed in claim 6, wherein the lookup table includes spring positions in terms of servo revolutions.

8. A fluid pressure reducing valve apparatus as claimed in claim 1, wherein the regulation plate is provided spaced from the diaphragm, on a guide rod extending from the diaphragm into a centering guide in the orifice.

9. A fluid pressure reducing valve apparatus as claimed in claim 1, wherein the spring is a compression spring acting on the side of the diaphragm remote from the orifice.

10. A fluid pressure reducing valve apparatus as claimed in claim 1, wherein the controllable motor drive includes a nut and lead screw device arranged to act on the spring at an end remote from diaphragm and actuatable by a motor of the drive.

11. A fluid pressure reducing valve apparatus as claimed in claim 1 in combination with a remote pressure sensor for measuring downstream pressure to be maintained.

12. A fluid pressure reducing valve apparatus comprising a spring loaded pressure reducing valve, a controllable motor drive, a flow meter and controller as defined in claim 1, wherein the fluid pressure reducing valve apparatus is linked to a remote control facility, from which remote control facility, the operation of the apparatus can be remotely controlled.

13. A water supply system, the water supply system comprising a plurality of local networks, each of the local networks being provided with a pressure reducing valve apparatus as defined in claim 1.

14. A method of controlling the water pressure in a local water network having a pressure reducing valve connecting the local water network to a high pressure mains supply, the method comprising:
    (i) providing the pressure reducing valve with a motorised actuator that can vary the flow of water into the network upon receipt of control signals from a controller;
    (ii) providing the network with a flow meter and pressure sensor downstream of the pressure reducing valve, the flow meter and sensor being in communication with the controller;
    (iii) measuring flow rates and pressures to establish a relationship between flow rate and pressure of water flowing into the network, and storing data establishing the relationship in the controller and/or a remote control location;
    (iv) using the said relationship to establish a pressure reducing valve setting at a given time point which maintains a desired minimum pressure at a defined remote location in the network; and
    (v) monitoring changes in the flow rate in the network detected by the flow meter and actuating the motorised actuator to change the pressure reducing valve setting in response to the changes in the flow rate in order to maintain the desired minimum pressure at the defined remote location in the network;
    wherein the pressure reducing valve is as defined in claim 1.

15. A fluid pressure reducing valve apparatus as claimed in claim 1, wherein the apparatus is adapted for reducing the pressure of hydrocarbon fluids both liquid and gaseous.

16. A fluid pressure reducing valve apparatus as claimed in claim 1, comprising:
    the orifice being disposed upstream of the fluid flow chamber;
    a guide disposed centrally within the orifice;
    the regulation plate being disposed downstream of the orifice; and a guide rod extending from the regulation plate through the guide;

wherein the guide rod and guide enables the regulation plate to be centered over the orifice.

17. A fluid pressure reducing valve apparatus comprising:

a spring loaded pressure reducing valve having:
- a body having an interior void partitioned by a diaphragm into a fluid-flow chamber on one side of the diaphragm and a dry chamber on the other side of the diaphragm,
- a fluid supply orifice into the fluid-flow chamber and a fluid outlet from the fluid-flow chamber,
- a regulation plate selectively closing the orifice and subject in use to supply fluid acting on it, the regulation plate being connected directly or via a connecting element to the said one side of the diaphragm, and the diaphragm in use being subject in use to regulated pressure in the fluid-flow chamber,
- a compression spring located in the dry chamber on the said other side of the diaphragm, the compression spring being arranged so as to apply pressure through the diaphragm to urge the plate towards the orifice, and
- a controllable motor drive acting between the body and an end of the compression spring remote from the regulation plate, a flow meter downstream of the outlet;

a controller and an electronic data store held within or being in communication with the controller, the data store containing data defining a relationship between fluid flow rate and fluid pressure in a downstream pipe network to which the pressure reducing valve is connected;

the controller being arranged to receive flow data from the flow meter and to control the motor drive for withdrawal or advancement of the remote end of the spring in accordance with the flow rate measured by the flow meter and the relationship between fluid flow and fluid pressure thereby to vary the position of the regulation plate and fluid flow through the fluid supply orifice to maintain a desired downstream fluid pressure.

* * * * *